April 1, 1958 J. O. PREISIG ET AL 2,829,335
HIGH VOLTAGE POWER SUPPLY
Filed March 1, 1954
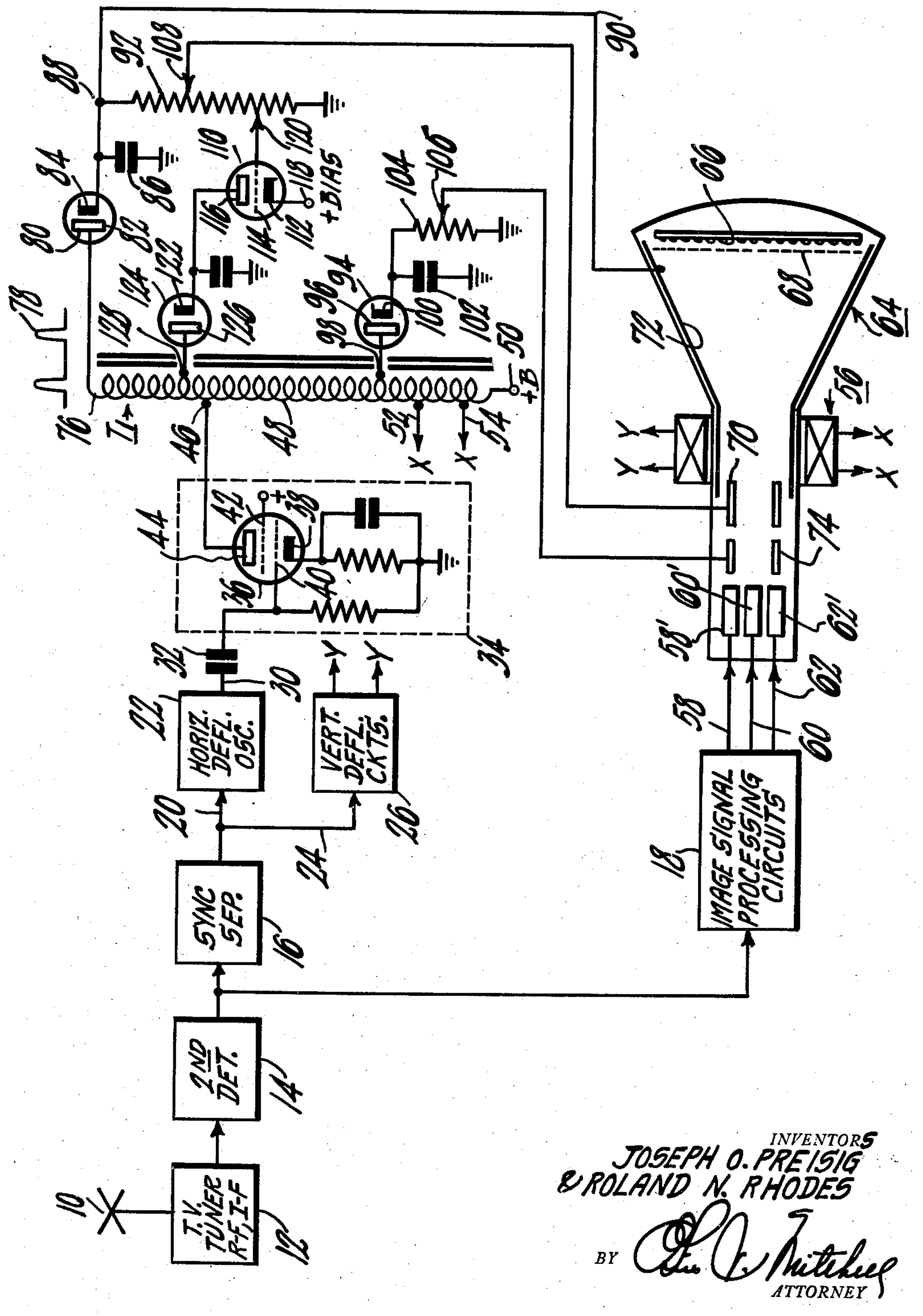
INVENTORS
JOSEPH O. PREISIG
& ROLAND N. RHODES
BY [signature]
ATTORNEY 2,829,335
Patented Apr. 1, 1958

1

2,829,335

HIGH VOLTAGE POWER SUPPLY

Joseph O. Preisig, Trenton, N. J., and Roland N. Rhodes, Levittown, Pa., assignors to Radio Corporation of America, a corporation of Delaware Application March 1, 1954, Serial No. 413,126

8 Claims. (Cl. 323—60)

The present invention relates to a new and improved regulated high voltage power supply of the "fly back" type for television receivers, and, more particularly, although not necessarily exclusively, to such apparatus as provides the degree of regulation required in the power supplies for color television image reproducing kinescopes.

As is now well known, one form of power supply generally employed for furnishing the necessary high voltages for kinescopes is that which utilizes the high voltage pulses which appear across the horizontal deflection output transformer during retrace intervals as a result of flux collapse at the end of the line scanning intervals. Such voltage pulses, proportional to the value $$L\frac{di}{dt}$$

where L is a circuit inductance and $i$ is the instantaneous current therein, is stepped up by an auxiliary transformer winding and rectified to produce a high, unidirectional voltage which, with suitable filtering, is employed directly as the final anode or "ultor" potential. It is, moreover, essential that the final anode voltage be maintained constant, in order that proper image reproduction be realized.

In kinescopes of the type involving electrostatic means for focusing of the electron beam or beams, additional means must be provided for furnishing the high focusing potential to a corresponding electrode in the tube. The beam-focusing potential must also be regulated, since its function is that of maintaining proper spot size on the tube screen or target. A still further requirement regarding the high voltage supplies is that the ratio of the final anode potential to the focus anode potential be constant. Failure of the system to meet this requirement results in undesirable spot astigmatism (i. e. distortion from the desired round spot) which deleteriously affects the image resolution in either a monochrome or color kinescope and which leads to spurious "color fringes" in a monochrome scene produced on the screen of a color kinescope.

It is, therefore, a primary object of the present invention to provide new and improved regulated high voltage apparatus.

Another object of the invention is the provision of a regulated power supply of the type described wherein a plurality of high voltage potentials are regulated so that their ratio is substantially constant.

In a fly back type of high voltage supply, one known mode of obtaining the desired final and focus anode potentials is that of employing a separate rectifier for each of the potentials, the two rectifiers being connected to different impedance points on the deflection output transformer. Since, inter alia, the coupling between that point in the transformer which is connected to the anode of the deflection output amplifier and, respectively, the final and focus anode points is different in the two cases, it has been found that any drift in pulse amplitude or shape is reflected differently percentagewise at the two rectifier locations. Such unequal drift is objectionable,

2 since it results in a changed ratio between the two potentials, the deleterious effects of which have been cited supra.

Hence it is a further object to regulate power supplies of the type in question against drifting of either of a plurality of potentials per se and the ratio of one such potential to another.

In general the present invention resides, in accordance with a specific embodiment thereof, in the provision of voltage regulator means capable of controlling a plurality of potential sources which derive their energization from spaced points on a transformer. In a case wherein a first rectifier is connected to the outermost winding of an autotransformer, for example, and a second rectifier is connected to an inner winding thereof, the present invention contemplates the location of the regulator tube at a point in such transformer intermediate the connection points of such first and second rectifiers, whereby the regulator corrects for energy drifts equally percentagewise for the first and second rectifier points.

Additional objects and advantages of the present invention will become apparent to persons skilled in the art from a study of the following detailed description of the accompanying drawing which illustrates, by way of block and schematic diagram, a television receiver embodying the principles of the invention.

While the invention is described herein in connection with a three-gun color kinescope of the shadow-mask type such as is described in an article entitled "A three-gun shadow mask color kinescope," by H. B. Law in the Proceedings of the IRE for October 1951, its applicability to other types of image reproducers, both color and monochrome, should be borne in mind. In the interest of completeness in description, the drawing illustrates the environment of the invention in a color television receiver. Antenna 10 intercepts the radio frequency waves bearing the image and synchronizing components and applies them to a tuner 12 which may comprise the conventional radio frequency (R. F.), converter, and intermediate frequency (I. F.) stages. The image and synchronizing components are detected by means indicated as block 14 and applied to the sync pulse separating circuit 16 and image signal processing circuits 18. The sync separator 16, which may be of any known, suitable variety, separates the horizontal (line frequency) and vertical (field frequency) sync pulses from the video portions of the detected composite signal and from each other, whereby horizontal pulses are applied via lead 20 to the horizontal deflection oscillator 22 and vertical deflection circuits 26.

The horizontal deflection oscillator 22, which may constitute, for example, a blocking oscillator familiar to those persons skilled in the art, provides horizontal frequency driving signals at lead 30, which signals are coupled via capacitor 32 to the input terminal of the horizontal deflection output amplifier 34. The amplifier comprises, for purposes of illustration, a tetrode 36 having a cathode 38, control electrode 40, screen grid 42 and anode 44. The driving signals are applied to the control electrode 40 in the usual manner and are amplified in the space current path of the tube which includes lead 46 and that portion 48 of the autotransformer $T_1$ which is connected between lead 46 and terminal 50 indicated as +B. In order to complete the general description of the present invention, it may now be noted that the horizontal deflection circuit, while indicated in its simplest form, may include such arrangements as "B-boost," damping means and the like. In the interest of simplicity, however, these circuits are not included in the drawing. Suitable taps 52 and 54 connected to transformer winding 48 are indicated as terminating at X—X. These taps are actually employed to drive a saw-tooth of current of line frequency through the horizontal winding of the deflection yoke 56, via the corresponding input terminals of the yoke bearing the reference characters X—X. The vertical deflection circuits, on the other hand, produce field frequency saw-tooth currents which are supplied via terminals Y—Y to the vertical deflection winding of yoke 56.

As has been stated supra, while the present invention is not limited in its utility to any specific form of image reproducing kinescope, it is herein illustrated in connection with a tricolor kinescope of the variety described in the above cited Law article. Thus, three leads 58, 60 and 62 furnish signals regarding each of the several colors to the electron guns 58', 60' and 62' of the tri-color kinescope 64. These guns, for example, may include electron beam sources and beam intensity-modulating electrodes (not shown) such as are described in detail in the U. S. patent application of Hanna C. Moodey, Serial No. 295,225, filed June 24, 1952, for "Multiple Beam Tube." The kinescope 54 is further shown as including a target assembly comprising the phosphor screen 66 and shadow mask 68, both of which elements are adequately discussed in the Law article. Briefly, however, it may be noted that in the kinescope 64, three electron beams are employed, one for each selected component color of the image to be reproduced. The beams strike phosphor screen 66 which is composed of a regular array of red, green and blue light emitting phosphor dots. The shadow mask 68, interposed between the electron guns and the screen 66 is a fine, perforated metal sheet which masks the electron beams. That is to say, the phosphor screen 66 may be made up of closely spaced trios of phosphor dots on a glass plate, each trio consisting of red, green and blue dots with the centers of the dots lying at the apices of an equilateral triangle. The trios themselves are located at the corners of a still larger equilateral triangle. The shadow mask 68 is provided with a hole or aperture for each of the phosphor trios, such holes also being located at the corners of an equilateral triangle. The three beams for guns 58', 60' and 62' are located 120° apart about the longitudinal axis of the tube and are converged to a point in the plane of mask 68 by means of a convergence lens system which, for example, may be made up of the convergence anode 70 and the final anode 72, the latter being illustrated as a conductive coating on the interior wall of the kinescope, which coating extends along the neck portion of the tube from a region in the vicinity of the convergence anode 70 to the region of the target assembly 66, 68. The matters of convergence in a color kinescope of a shadow mask type are described in detail in an article entitled "Deflection and convergence in color kinescopes," by A. W. Friend, which appeared in the same issue of the Proceedings of the IRE cited above. It is sufficient to note here that the direct current potential difference between the convergence anode 70 and the final anode 72, when properly maintained, causes the three beams to converge in the plane of the shadow mask. Prior to their entrance into the convergence region, however, the beams pass through a focus anode 74 which, as has been stated herein, must also be maintained at a fixed direct current potential having an established value with respect to the potentials of the convergence and final anodes.

The present invention, which is concerned with the apparatus for deriving the several direct current potentials for the high voltage electrodes of kinescope 64, will now be described. Referring again to the horizontal deflection output circuitry, it will be seen that transformer $T_1$ includes a conventional step-up winding 76. As will be understood by those skilled in the art to which the present invention is directed, conventional television scanning practice requires that the scanning beam or beams be deflected rapidly from the end of one line scansion to the beginning of the next line. Such retrace or fly-back is accompanied by the collapse of flux in the transformer $T_1$, whereby there is developed a large amplitude voltage pulse 78 proportional to $$L\frac{di}{dt}$$

which pulse is of sufficient amplitude, when magnified by the step-up winding 76, to be used for developing the high, unidirectional potential required for the final anode of the kinescope. Thus there is connected to winding 76 the anode 80 of a rectifier diode 82 whose cathode 84 is connected to ground via a filter capacitor 86 and to the high voltage output terminal 88. The high voltage at terminal 88 is applied via lead 90 to the kinescope final anode 72. A large bleeder resistance 92 is connected between terminal 88 and ground, whereby it constitutes a portion of the load supplied with voltage from rectifier 82. A second rectifier 94 is conventionally provided such that its anode 96 is connected to point 98 on winding 48 and its cathode 100 is connected to filter capacitor 102. A bleeder resistance 104 is connected between cathode 100 and ground. Rectifier 96, known as the "focus rectifier" is, as may be noted from the drawing, connected to transformer $T_1$ at a lower impedance point than high voltage rectifier 82. Thus, the amplitude of the pulses at terminal 98, being smaller than the amplitude of pulses 78, will, when rectified by diode 94, furnish a direct current potential lower than that available at terminal 88. An adjustable slider tap 106 selects the desired potential from across bleeder 104 and applies it to the focus electrode or electrodes 74. An adjustable slider tap 108 selects the necessary potential from across bleeder resistance 92 and applies it to the convergence anode 70.

As thus far described, the deflection and high voltage circuitry is in accordance with wide-spread present-day practice. As pointed out generally herein, it is necessary that some means be provided for regulating the final anode and focus voltages against drift. Ordinarily, regulation is provided for the high voltage supply at terminal 88 through the agency of a shunt regulator triode whose anode is connected to terminal 88 and whose cathode is supplied with a suitable biasing potential. The control electrode of such a shunt regulator tube is ordinarily adjustably connected to a point on the high voltage bleeder 92, whereby, as the high voltage tends to increase, the control electrode of the shunt regulator tube is rendered more positive by the sample derived from the bleeder so that the tube conducts more heavily and, by imposing an additional load on the pulses at the high voltage rectifier tap, overcomes the tendency of the high voltage to increase at point 88. Conversely, a tendency to decrease produces the reverse situation in shunt regulator tube and the decrease is compensated. It has been found by the present applicants, however, that in a transformer, the stray capacitance and inductance of the transformer circuit produce a rather complex network of such form that drifts in the circuit constants (i. e. inductance, resistance and capacitance) or changes in the shape or amplitude of the driving pulses result in non-proportional drift of the high voltage at terminal 88 and the focus voltage at tap 106. Inter alia, this result stems from the fact that the coupling between the drive point 46 and the tap-in points of the anode voltage and focus voltage rectifiers is different. Hence, it will be understood that the two rectifier points will be affected differently by any given drift in the transformer circuit. Moreover, an increase of anode current of the kinescope 64 will result in an increased focus current which is accompanied by an undesirable decrease of the focus voltage at tap 106. Thus, it will be understood that, where the regulator tube is connected at terminal 88, the anode voltage will be held constant, but the focus voltage relative to the anode voltage will change so that, for example, a down drift of the pulse voltage at the rectifier will bring about a down drift of the focus voltage with respect to the final anode voltage. That is to say, the action of a shunt regulator tube is that of increasing the load on the pulse amplitude to compensate for an increased high voltage and decreasing the loading on the pulse amplitude when the high voltage tends to decrease. The loading effect of the regulator tube, while effective at the anode voltage rectifier point for drifting anode voltage, does not load the pulse amplitude at the focus rectifier point in the same proportion. On the other hand, it will be understood that, as the regulator tube is connected across the focus voltage supply, the focus voltage will be held constant but the anode voltage will be free to drift with respect thereto, since the loading by the regulator at the focus rectifier point is not reflected in the same percentage at the anode rectifier point.

In view of the foregoing considerations, and in accordance with a specific embodiment of the present invention, there is provided a shunt regulator tube 110 which constitutes a triode having a cathode 112, control electrode 114 and anode 116. The cathode is connected to a terminal 118 at which there is available a suitable positive biasing potential for the tube. The control electrode 114 is connected via an adjustable tap 120 to a suitable point on bleeder resistance 92, so that changing current through the bleeder resistance will be reflected at control electrode 114. The anode 116 of regulator tube 110 is connected to the cathode 122 of an additional rectifier 124 whose anode 126 is connected to point 128 on transformer $T_1$, which point is intermediate the locations of the focus and final anode rectifiers. A filter capacitor 130 connected between cathode 122 of the rectifier 124 and ground completes that portion of the circuit.

While additional causes may be present, the non-proportionality of the high voltage and focus voltage as a function of drift has been found to result from the fact that the coupling of those two points with respect to the drive point 46 is different. Thus it may be said, for example, that the coupling between the drive point 46 and the focus rectifier point 98 is "tighter" than is the coupling between point 46 and the high voltage rectifier connection. Moreover, the circuit parameters of the transformer arrangement are such that the pulse present at the focus point 98 contains harmonics of a certain phase while the additional stray couplings of the transformer produce the fundamental and some harmonics of different phase and amplitude at the high voltage rectifier point. Another reason for the coupling difference is that the temperature of the inner windings (i. e. between terminal 46 and terminal 98) rises to a greater value during warm-up than the temperature of the outer winding 76. Thus, as used herein and in the appended claims the term "coupling" should be understood in its broad sense and not limited to any specific or literal meaning such as inductive or capacitive coupling.

It has been noted, moreover, that a change in one of the voltages with respect to the other produces, first of all, a misfocus of the electron beam or beams and also to an astigmatic distortion of the scanning spots produced by the beams on the tube screen. In a color kinescope such as that shown at 64, the latter distortion is particularly undesirable, however, since it takes the form of unequal elongation of the three scanning spots, which elongation occurs in different directions, so that the beams will strike portions of phosphor dots which they are not intended to strike, thus causing color edges or fringes to be produced in a scene which is properly made up of only black-and-white portions.

By reason of the foregoing, point 128 to which the rectifier anode 126 is connected must be carefully chosen to meet the requirement that it couples equally to both the high voltage rectifier 82 and the focus rectifier 94. That is to say, point 128 must be so located as to reflect the pulse-loading action of the regulator tube in the same proportion at the points to which the two high voltage rectifiers are connected.

Thus, in the operation of the present invention, the pulses present at point 128 of the transformer $T_1$ are rectified by diode 124 and filters and capacitor 130 to provide a unidirectional potential for the anode 116 of regulator tube 110. Since the control electrode of the regulator tube is connected via tap 120 to the high voltage bleeder resistance 92, any voltage change at terminal 88 will be sampled and reflected in the changed biasing of the regulator tube. Moreover, by virtue of the fact that point 128 is equally coupled, magnetically and otherwise, to the focus and high voltage points of the transformer, changes in the pulse-loading by the regulator tube will be effective in the same proportion on the pulse amplitudes at the tap-in points of the anode and focus voltage rectifiers. Therefore, regulator tube 110 maintains each of the final anode and focus voltages constant and also the ratio between the two. Additionally, the intermediate location of the regulator tube assists in causing the focus voltage to follow load-change-induced high voltage variations whereby to maintain the desired constant ratio. For example, if the anode load caused point 88 to increase in voltage, the current drawn by tube 110 would increase, thereby loading the focus rectifier point to cause the focus voltage to increase.

While the invention has been described in accordance with an operative embodiment having a specific form, it should be borne in mind that the principles of the invention are applicable to other forms of transformers such as are conventionally employed in conjunction with deflection output circuits involving fly-back power supplies.

Having thus described our invention, what we claim as new and desire to secure by Letters Patent is:

1. Voltage regulating apparatus for a high voltage power supply of the type including an inductive winding, means for producing an alternating voltage in such winding, and first and second rectifier means connected to spaced impedance points on such winding for deriving unidirectional potentials for application to respective load terminals, which apparatus comprises: variable conduction load means; and means for coupling said last-named variable conduction load means to a different impedance point on such winding intermediate such spaced points, said intermediate point being so located that said variable conduction load means has a proportional loading effect on the alternating voltage at said spaced points.

2. Voltage regulating apparatus for a high voltage power supply of the type including an inductive winding, means for producing an alternating voltage in such winding, and first and second rectifier means connected to spaced impedance points on such winding for deriving unidirectional potentials for application to respective load terminals, which voltage regulating apparatus comprises: variable conduction load means; and third rectifier means for coupling said last-named variable conduction load means to an impedance point on such winding intermediate such spaced points, said intermediate impedance point being so located that said variable conduction load means has a proportional loading effect on the alternating voltage at said spaced points.

3. Voltage regulating apparatus for a high voltage power supply of the type including an inductive winding, means for producing an alternating voltage in such winding, and first and second rectifier means connected to spaced impedance points on such winding for deriving unidirectional potentials for application to respective load terminals, such winding being characterized in that it inherently has unequal coupling between such spaced points, said voltage regulating apparatus comprising: variable conduction load means; and third rectifier means for coupling said last-named means to an impedance point on such winding intermediate such spaced impedance points, said intermediate point being so located that said variable conduction load means has a proportional loading effect on the alternating voltage at said spaced points.

4. Voltage regulating apparatus for a high voltage power supply of the type including an inductive winding, means for producing an alternating voltage in such winding, and first and second rectifier means connected to spaced impedance points on such winding for deriving unidirectional potentials for application to respective load terminals, such winding being characterized in that the amplitude of such alternating voltage at one of such spaced points is not affected proportionally by loading of the voltage on the other of such spaced points, said voltage regulating apparatus including: variable conduction load means; and third rectifier means for coupling said last-named means to an impedance point on such winding intermediate such spaced impedance points, said intermediate impedance point being so located that said variable conduction load means has a proportional loading effect on the alternating voltage at said spaced points.

5. In a high voltage power supply for an image reproducing cathode ray tube of the type having an inductive winding, means for producing an alternating voltage in such winding, and first and second rectifying means connected to spaced impedance points on such winding, and having load terminals for connection to operating electrodes of such tube, voltage regulator means comprising: an electron tube having a cathode, anode and control electrode; means for biasing said electron tube to determine its conduction characteristics; means for applying to said control electrode a sample of the voltage appearing at one of such load terminals; and unidirectionally conductive means connecting said anode to an impedance-voltage point on such winding intermediate such spaced impedance points.

6. Voltage regulating apparatus for a high voltage power supply of the type having an inductive winding coupled to means for producing an alternating voltage in such winding and first and second rectifying means coupled to spaced impedance points on such winding, each of such rectifying means having a load terminal, said voltage regulating apparatus comprising: an electron tube having an anode and a control electrode; means for coupling one of such load terminals to said control electrode in such manner as to apply to said control electrode a sample of the voltage at such terminal; a third rectifier means; means connecting said third rectifier means to said electron tube anode to apply a direct current potential to said anode; and means connecting said third rectifier means to a coupling point on said winding intermediate said spaced points.

7. Voltage regulating apparatus for a high voltage power supply of the type having an inductive winding, means coupled to such winding for producing an alternating voltage therein, and first and second rectifier means coupled to spaced impedance points on such winding, each of such rectifier means having an output terminal, said regulating apparatus comprising: an electrode tube having an anode and a control electrode; means for connecting said control electrode to such output terminal of one of such rectifier means, whereby to apply a sample of the output voltage at such terminal to said electrode; a third rectifier means having a cathode and an anode; means connecting said anode of said third rectifier means to an impedance point on said winding intermediate such spaced impedance points; and means connecting said cathode of said third rectifier means to said electron tube anode.

8. Voltage regulating apparatus for a high voltage power supply of the type having an inductive winding, means coupled to such winding for producing an alternating voltage therein, and first and second rectifier means coupled to spaced coupling points on such winding, each of such rectifier means having an output terminal, said voltage regulating apparatus comprising: an electron tube having an anode and a control electrode; means for connecting said control electrode to such output terminal of one of such rectifier means, whereby to apply a sample of the output voltage at such terminal to said electrode; a third rectifier means having a cathode and an anode; means connecting said anode of said third rectifier means to a coupling point on said winding intermediate such spaced points; means connecting said cathode of said third rectifier means to said electron tube anode, so that said electron tube serves as a variable load upon the alternating voltage at said intermediate point, said intermediate coupling point being so located as to be coupled equally to said first and second coupling points so that said variable load means affects such alternating voltage at such spaced points in a proportionate manner.

References Cited in the file of this patent

UNITED STATES PATENTS

| | | |
|---|---|---|
| 2,404,624 | Dome | July 23, 1946 |
| 2,679,550 | Parker | May 25, 1954 |
| 2,726,340 | Nelson | Dec. 6, 1955 |